United States Patent [19]
Branch

[11] Patent Number: 5,114,187
[45] Date of Patent: May 19, 1992

[54] BAR CODED LAUNDRY TICKET

[76] Inventor: Thomas R. Branch, 725 Cedar Creek Way, Woodstock, Ga. 30188

[21] Appl. No.: 634,615

[22] Filed: Dec. 27, 1990

[51] Int. Cl.$^5$ .............................................. B42D 15/00
[52] U.S. Cl. ....................................... 283/81; 283/117
[58] Field of Search .................................. 283/81, 117

[56] References Cited

U.S. PATENT DOCUMENTS

| 3,711,683 | 1/1973  | Hamisch, Sr. | 40/299 X  |
| 4,260,656 | 4/1981  | Mullen       | 283/81 X  |
| 4,715,622 | 12/1987 | Mikhail      | 283/81 X  |
| 4,763,930 | 8/1988  | Matney       | 283/81 X  |

FOREIGN PATENT DOCUMENTS 3726928  2/1989  Fed. Rep. of Germany ........ 283/81

Primary Examiner—Paul A. Bell
Attorney, Agent, or Firm—Jason A. Bernstein

[57] ABSTRACT

A laundry ticket is provided that has separable tag portions with adhesive strips on opposite ends on one side thereof. The tags are threaded through a button hole and the two adhesive portions brought together to attach the tag to a garment without the use of staples. The tags bear bar coded identification data for associating an item of laundry with a laundry ticket.

1 Claim, 1 Drawing Sheet

BAR CODED LAUNDRY TICKET

CROSS REFERENCE TO RELATED APPLICATIONS

The subject matter described in this application is related to the material disclosed in co-filed U.S. patent application Ser. No. 07/634,614 "Apparatus and Method for Automatically Assembling Laundry" by the present inventor.

TECHNICAL FIELD

This invention relates generally to tickets, and more particularly relates to a laundry ticket with separable members for attaching to laundry.

BACKGROUND OF THE INVENTION

When a customer drops off a load of clothes to be laundered, the cleaner writes up a ticket giving the customer a portion thereof as a receipt. The cleaner keeps one portion of the ticket as his inventory and receipt and places the main portion of the ticket with the clothes. The cleaner removes a separable portion of the ticket with an identification number and attaches one of these separable portions to each of the items of laundry for tracking purposes.

The laundry items are sorted and washed in lots to efficiently use the laundry equipment. In the case of shirts, a machine can handle a hundred or so at one time. Each machine load is called a lot, and within each lot the shirts are in no particular order. Before the shirts leave the cleaning area, they must be starched, ironed and assembled with the ticket with which they arrived. Accordingly, it will be appreciated that it would be highly desirable to be able to easily reassemble the finished laundry with the proper ticket.

A problem with the tagging process is that a worker must staple a separable tag to each shirt. This is typically done with two staples to ensure that the tag stays attached to the shirt during the washing and ironing. Even when being extremely careful, a worker is likely to staple the tag insecurely or staple his finger. The result of such an error is that a customer receives the wrong item or no item at all, or work time is lost which decreases efficiency. It is desirable to have a tag that is easy to attach securely and does not present an opportunity for a worker to staple his finger.

SUMMARY OF THE INVENTION

The present invention is directed to overcoming one or more of the problems set forth above. Briefly summarized, according to one aspect of the present invention, a laundry ticket has a main body and at least one separable member detachably connected to the main body. The separable member has a front surface with first and second end portions, and a rear surface with first and second end portions. The first end portion of the front surface has identification data imprinted thereon. The second end portion of said front surface has piece data imprinted thereon indicating the number of separable members with the ticket. The first and second end portions of the rear surface of the separable member has an adhesive thereon.

The present invention utilizes a bar code on the separable member attached to each item of laundry. The bar code is scanned into a computer which controls movement of a sorting machine that automatically assembles the laundered items with the appropriate ticket. A feature of the present invention is bar coded laundry tickets with separable members that are attachable to the laundry items without the use of metal staples. An advantage of the staple free laundry tickets is the saving of time when attaching the separable portions of the ticket to the items to be cleaned. Staples have a tendency to catch in the threads of garments causing damage to the garments. The laundry ticket of the present invention does not use staples and has no metal parts to damage items of laundry. The staples also occasionally injure workers causing a loss of productivity.

The present invention also saves labor by eliminating the need for a worker to physically read the identifying data from each separable ticket member in a lot of laundry. The present invention reduces errors by eliminating the need for a worker to manually examine the identifying data on each item thereby reducing the possibility of human error in this step of the sorting process. The bar code is ideal for use with a n optical scanner.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE PREFERRED EMBODIMENTS

Figure 1:
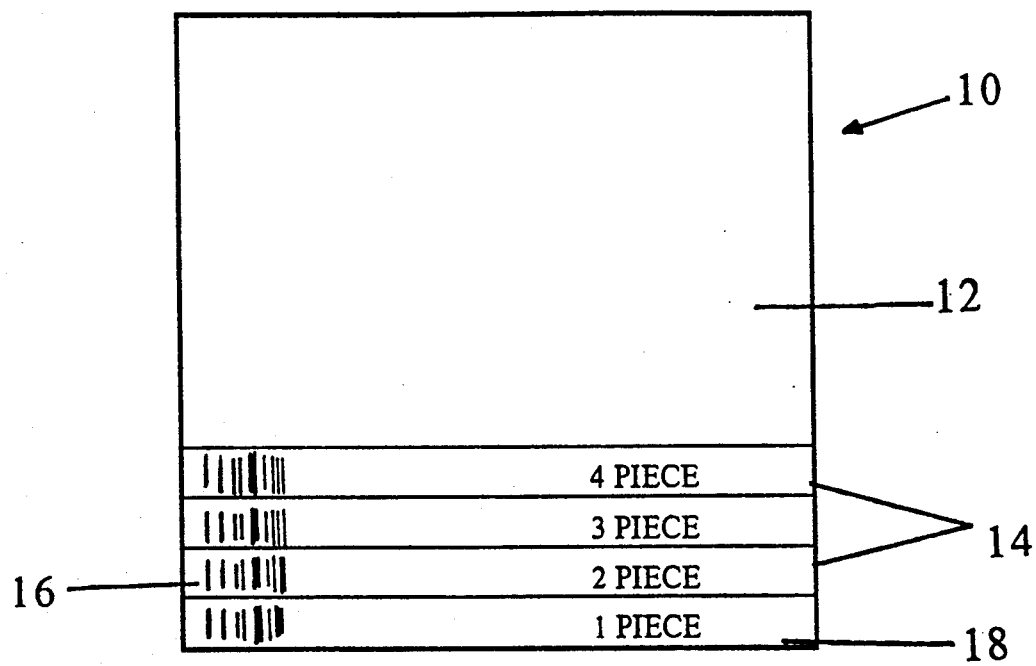
FIG. 1 is a diagrammatic front view of a preferred embodiment of a laundry ticket with separable members constructed in accordance with the present invention.
Figure 2:
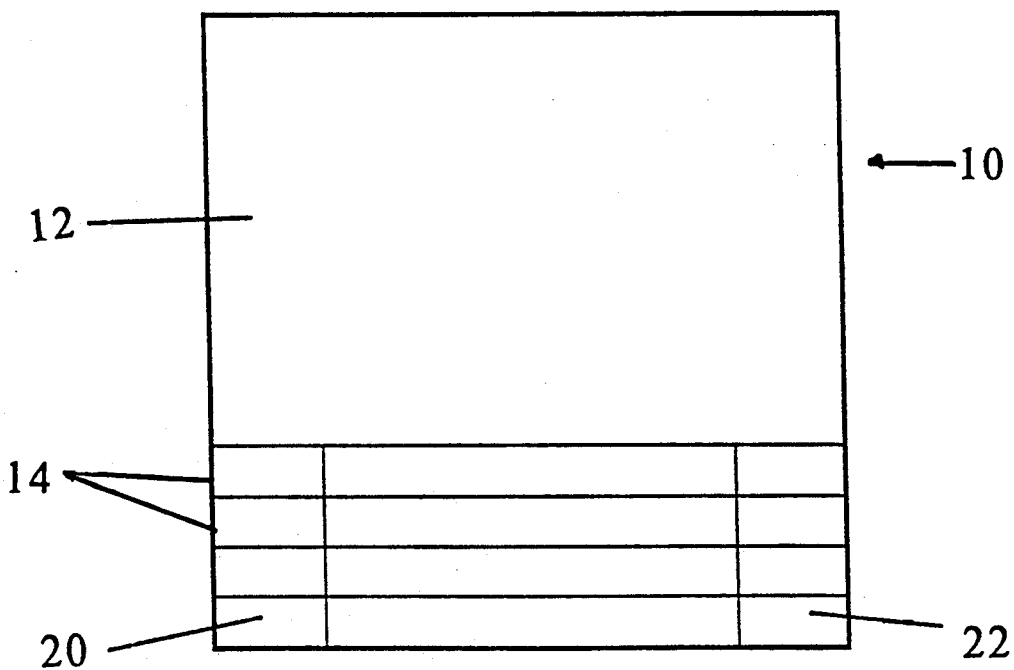
FIG. 2 is a diagrammatic rear view of the laundry ticket illustrated in FIG. 1.

Referring to FIGS. 1 and 2, a laundry ticket 10 is constructed of paper or other material having a writing surface, and has a body 12 and one or more separable members 14. The tag is preferably made of a waterproof material and can withstand the water temperatures encountered in commercial washers as well as the chemicals involved in dry cleaning. Each separable member 14 may be separated from the body 12 of the laundry ticket 10 and contains data such as a number or bar code 16 along with piece data 18 indicating the number of pieces of laundry to be associated with the ticket 10. The bar coded data 16 and the piece numbers 18 are on the front surface of the separable tags 14 with the bar coded data 16 being on one end and the piece numbers 18 on the other end. When the tag 14 is folded in half, the bar code 16 is on one half and the number 18 is on the other half. Alternatively, both could be on each half. The number of separable tags 14 is equal to the maximum number of pieces of laundry for which the ticket 10 is designed. Thus, a ticket 10 for up to four pieces of laundry will have four separable tags 14.

The laundry ticket 10 has a rear surface and the separable tags 14 also have a rear surface. The rear surfaces of the separable tags 14 are coated on the end portions 20, 22 with an adhesive. Naturally, the adhesive must be waterproof and able to withstand the water temperatures encountered in commercial washers. Also, when dry cleaning is involved, the adhesive must be able to withstand the chemicals used. Only a small area of the tags 14 need to be coated with adhesive. It is not desirable to coat the entire surface with adhesive so that the tag 14 may be maneuvered once it is attached through the button hole of a garment. This maneuverability will aid in keeping the tag 14 flat when the shirt is ironed.

While operation of the present invention is believed to be apparent from the foregoing description, a few words will be added for emphasis. Operation is best illustrated with an example using a customer who has three shirts to be laundered. The cleaner writes a ticket 10 with the customer's name, address, or other identifying data so that the shirts can be returned to that customer when finished. The ticket 10 the cleaner chooses will be a ticket that is designed for at least three pieces; that is, a ticket with at least three separable tag portions 14. Many cleaners physically write the number of shirts on the body 12 of the ticket 10, so that, when the finished shirts are reassembled with the ticket 10, the number of pieces is known. If a four piece ticket is used for three shirts, it is not necessary to write the number of pieces on the ticket because one of the separable tags 14 will remain with the ticket 10 making it obvious at a glance that only three tags 14 were used. It is not necessary to write numbers on the ticket where the number of tags 14 is imprinted on the body 12 of the ticket 10 and the proper ticket is always used. However, it is convenient to have only a few sizes available to minimize inventory and efficiently use space.

As a separable tag member 14 is separated from the body 12, it is threaded through a button hole in a shirt, and the adhesive members 20, 22 are brought together to secure the tag 14 to the shirt. Because adhesive is used, there is no need for staples which not only reduced the risk of injury, but saves times as well. The adhesive only covers a small portion of the rear surface of the tag 14 so that when the ends are pressed together, the tag 14 can be moved about the button hole. This movement is desirable to allow the tag 14 to be ironed flat without twisting or curling. The finished shirt is easily reassembled with the ticket by actually matching the number 16 on the tag 14 with the number on the ticket 10, or by using a scanner to scan the bar code 16 for automatic assembly using an automatic laundry sorting apparatus. Such an automatic laundry sorting apparatus is described in co-filed application Ser. No. 07/634,614 "Apparatus and Method for Automatically Assembling Laundry" which is incorporated herein by reference.

It will now be appreciated that there has been presented an apparatus and method for sorting laundry which enables a launderer to reassemble the prepared laundry with its ticket with a minimum amount of handling. The laundry ticket has bar coded identifying data which does not deteriorate in the cleaning process and remains crisp, clear and easy to read. Each item in a lot is reunited with the appropriate ticket without manually handling each item at each step of the reassembly process as was done in the past.

The present invention utilizes a bar code on the separable member attached to each item of laundry that is scanned into a computer which controls movement of a sorting machine that automatically unites the proper laundered items with the appropriate ticket. It saves labor by eliminating the need for a worker to physically read the identifying data from each separable ticket member in a lot of laundry. The present invention reduces errors by eliminating the need for a worker to manually examine the identifying data on each item thereby reducing the possibility of human error in this step of the sorting process.

While the invention has been described with reference to laundry operation, it is apparent that the invention is easily adapted to other operations where sorting of garments is done, such as uniform rental operations, for example.

While the invention has been described with particular reference to a preferred embodiment, it will be understood by those skilled in the art that various changes may be made and equivalents may be substituted for elements of the preferred embodiment without departing from invention. In addition, many modifications may be made to adapt a particular situation and material to a teaching of the invention without departing from the essential teachings of the present invention.

As is evident from the foregoing description, certain aspects of the invention are not limited to the particular details of the examples illustrated, and it is therefore contemplated that other modifications and applications will occur to those skilled the art. For example, the body of the ticket 10 can also have a number or bar code to match the number or bar code 16, and to correspond to the piece data 18. It is accordingly intended that the claims shall cover all such modifications and applications as do not depart from the true spirit and scope of the invention.

I claim:

1. A laundry ticket made of a waterproof material and can withstand the water temperatures encountered in commercial washers as well as the chemicals involved in dry cleaning comprising:
   a main body; and
   at least one separable member detachably connected to said main body and having a front surface with first and second end portions, and a rear surface with first and second end portions, said first end portion of said front surface having identification data imprinted thereon, said second end portion of said front surface having piece data imprinted thereon indicating the number of separable members with said ticket, said first and second end portions of said rear surface of said separable member having an adhesive thereon.

* * * * *